United States Patent
Lettington (10) Patent No.: US 8,259,378 B2
(45) Date of Patent: *Sep. 4, 2012

(54) SCANNING APPARATUS FOR SCANNING ELECTROMAGNETIC RADIATION

(75) Inventor: Alan H. Lettington, Berkshire (GB); Brenda Lettington, legal representative, Berkshire (GB)

(73) Assignee: Farran Technology Limited, County Cork (IE)

( * ) Notice: Subject to any disclaimer, the term of this patent is extended or adjusted under 35 U.S.C. 154(b) by 1029 days.

This patent is subject to a terminal disclaimer.

(21) Appl. No.: 10/594,351

(22) PCT Filed: Feb. 25, 2005

(86) PCT No.: PCT/GB2005/000698
§ 371 (c)(1), (2), (4) Date: Mar. 9, 2009

(87) PCT Pub. No.: WO2005/096064
PCT Pub. Date: Oct. 13, 2005

(65) Prior Publication Data
US 2010/0027090 A1   Feb. 4, 2010

(30) Foreign Application Priority Data

Mar. 30, 2004 (GB) .................................. 0407136.1
Nov. 2, 2004 (GB) .................................. 0424268.1

(51) Int. Cl.
*G02B 26/08* (2006.01)

(52) U.S. Cl. ............... 359/201.2; 359/203.1; 359/212.2; 359/216.1; 359/218.1; 359/220.1; 359/352; 359/629; 359/634; 359/638; 359/640; 359/839; 359/850; 359/857; 359/858; 359/864

(58) Field of Classification Search ............... 359/201.2, 359/203.1, 212.1, 212.2, 216.1, 217.1, 218.1, 359/220.1, 219.1, 226.1, 352, 486, 490, 501, 359/629, 634, 638–640, 839, 850, 857, 858, 359/864, 872, 876; 250/235, 239; 343/758, 343/765

See application file for complete search history.

(56) References Cited

U.S. PATENT DOCUMENTS

| 4,413,878 | A  | * | 11/1983 | Lettington | ................. 359/203.1 |
| 4,733,072 | A  | * | 3/1988  | Lettington | .................... 250/235 |
| 6,259,414 | B1 | * | 7/2001  | Lettington | .................... 343/757 |
| 6,587,246 | B1 | * | 7/2003  | Anderton et al. | .......... 359/212.2 |
| 7,067,798 | B2 | * | 6/2006  | Lettington | .................... 250/235 |
| 7,154,650 | B2 | * | 12/2006 | Lettington | ................. 359/201.1 |

* cited by examiner

*Primary Examiner* — Frank Font
(74) *Attorney, Agent, or Firm* — Marshall, Gerstein & Borun LLP (57) ABSTRACT

A scanning apparatus operable in the microwave, mm-wave, sub mm-wave (Terahertz) and infrared ranges comprises a primary drum (10) mounted for rotation about a central axis A of the primary drum being hollow and of rectangular polygonal form to provide a number of sides or facets (12, 14) each adapted to transmit such radiation, from a field of view, which is plane polarized in a first direction at 45° with respect to the rotary axis of the drum and to reflect radiation which is plane polarized in an orthogonal direction. Thus, radiation passing into the drum though whichever said side of the drum is currently facing the field of view and passing towards the diametrically opposite side will be plane polarized with a polarization direction such as to be reflected back by that diametrically opposite side towards the rotary axis of the drum. Each polygon side of the drum is configured so as to act, when reflecting radiation striking that side from within the drum, as a concave mirror, to focus the radiation towards a receiver assembly which includes a radiation detector for such radiation. In another embodiment scanning apparatus operable in the microwave, sub mm-wave, mm-wave and infrared ranges may comprise a reflective disc or mirror (50', 52') mounted for rotation relative in a support (74, 76) is itself mounted for rotation with respect to a second support (86) about a second axis inclined with respect to the first axis.

16 Claims, 7 Drawing Sheets

SCANNING APPARATUS FOR SCANNING ELECTROMAGNETIC RADIATION

THE PRESENT INVENTION relates to a scanning apparatus operable in the infrared, sub mm-wave (TeraHerz), mm-wave or microwave ranges of electromagnetic radiation. It is an object of the present invention to provide an improved scanning apparatus operable with radiation of the wavelengths indicated, having a large effective aperture and which is able to repeatedly scan, at a high rate, a two-dimensional (e.g. altitude and azimuth) field of view, and which yet can be constructed at reasonably low expense.

In infrared imaging systems, use is frequently made of flapping mirrors and rotary polygons with reflective surfaces to scan the scene. In these infra red systems the pupil in the scanner is typically 10 mm in diameter. In mm-wave or microwave systems however the apertures to be scanned are frequently 1 m or larger in diameter and the use of large flapping mirrors at high scan rates (e.g. such as to provide ten field scans or "frames" per second or more) is not practical in these systems. It is known that tilted rotary discs may be used to scan large apertures but these produce a conical scan pattern or a linear scan with a large amount of pupil wander.

In accordance with a first aspect of the present invention, there is provided scanning apparatus operable in the microwave, mm-wave sub mm-wave (TeraHerz) and infrared ranges and comprising a support structure, a primary drum which is mounted in said support structure for rotation relative to the support structure about a central axis of the primary drum, said primary drum being hollow and internally of regular polygonal form to provide a number of sides or facets, (ideally, but not necessarily, an even number of sides or facets), each adapted to transmit such radiation which is plane polarised in a first direction at 45° with respect to the rotary axis of the drum and to reflect radiation which is plane polarised in a direction at 45° to the rotary axis of the drum and perpendicular to the said first polarisation direction, such radiation emanating from a field of view of the apparatus, being a field of view which is fixed with respect to said supporting structure, (as opposed to rotating with the primary drum), the arrangement being such that radiation passing into the drum through whichever said side of the drum is currently facing said field of view and passing towards the diametrically opposite side will be plane polarised with a polarisation direction such as to be reflected back by said diametrically opposite side towards the rotary axis of the drum, each said polygon side being configured so as to act, when reflecting such radiation striking that side from within the drum, as a concave mirror, to focus the radiation towards a receiver assembly which includes a radiation detector for such radiation.

In accordance with a second aspect of the invention there is provided scanning apparatus operable in the microwave, mm-wave sub mm-wave (TeraHerz) and infrared ranges and comprising a support structure, a first reflective disc or mirror which is mounted in said support structure for rotation relative to the support structure about a first axis, a second reflective disc or mirror which is mounted in said support structure for rotation relative to the support structure about a second axis, the arrangement being such that radiation from a scene being scanned can reach a reflective surface of the first disc or mirror to be reflected thereby onto a reflective surface of the second disc or mirror, to be reflected by the latter, in turn, onto a further part of the apparatus incorporating a receiver or receivers for such radiation, and wherein said reflective surface of the first disc or mirror has an axis of rotational symmetry, (or a normal where said surface is planar), tilted at a small angle relative to said first axis and wherein said reflective surface of the second disc or mirror has an axis of rotational symmetry (or a normal where said surface is planar) tilted at a small angle relative to said second axis, and driving means for said discs or mirrors arranged to drive these in respective opposite senses.

It is an object of the invention in yet another of its aspects to provide apparatus which can effectively simulate the action of a flapping mirror, without the problems associated with rapid changes of momentum which place practical limitations on the aperture size and rate of scan (rate of flap) of a flapping mirror.

In accordance with this further aspect of the invention there is provided scanning apparatus' operable in the microwave, mm-wave sub mm-wave (TeraHerz) and infrared-ranges and comprising a first support structure and a reflective disc or mirror which is mounted in said first support structure for rotation relative to the first support structure about a first axis and wherein the reflective surface of the first disc or mirror has an axis of rotational symmetry, (or a normal where said surface is planar), tilted at an angle relative to said first axis and in which said first support structure is itself mounted for rotation with respect to a second support structure about a second axis inclined with respect to said first axis at the same angle as that at which said axis of rotational symmetry or normal is tilted relative to said first axis, the apparatus including means for rotating said reflective disc or mirror on or in said first support structure about said first axis at a first rate relative to said second structure and means for rotating said first support structure, relative to said second support structure about said second axis at the same rotational rate as said first rate but in the opposite rotational sense from that in which said reflective disc or mirror is rotated, whereby said reflective disc or mirror can effect a back and forth linear scan in a field of view.

It will be understood that apparatus as set out above can be combined with further means for effecting an orthogonal scan at a different rate in a field of view to produce a two-dimensional raster scan of the field of view. Such further means may comprise a further linear scan apparatus as set out above or may comprise some other known means for producing a linear scan, for example a simple flapping mirror may be used to effect a field scan at a relatively low scan rate whilst scanning apparatus as set out in the preceding paragraph above, comprising a rotating and precessing reflective disc or mirror, effects a line scan at a substantially higher rate.

The present invention makes it possible to manufacture a system for providing multiple linear scans, in a compact arrangement that is suitable for use in high-speed mm-wave and microwave applications.

Embodiments of the invention are described below with reference to the accompanying schematic drawings in which:—

Figure 1:
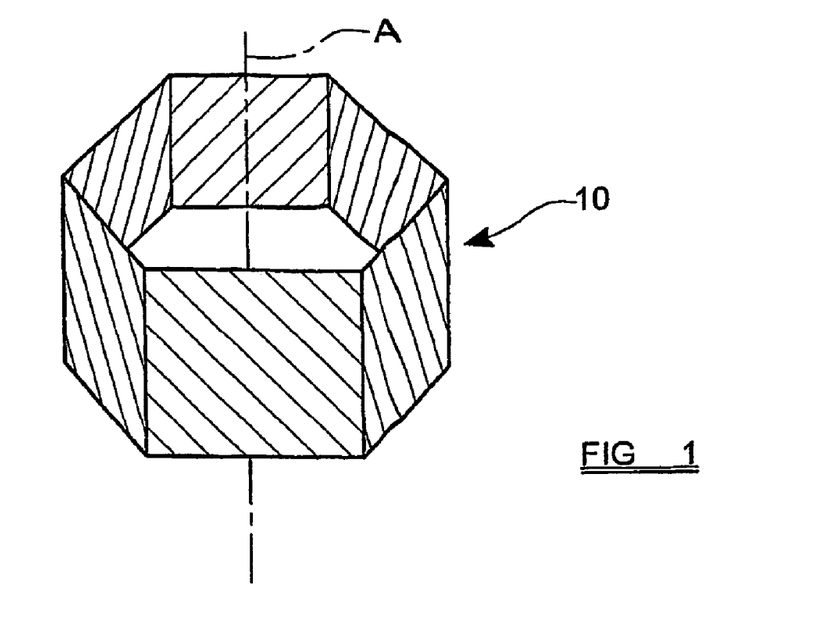
FIG. 1 is a perspective view representing part of a first embodiment of the invention.

Referring to FIG. 1, a millimeter wave scanning apparatus comprises a hollow polygonal drum 10 which is mounted in a supporting structure (not shown) for rotation about an axis A passing through the centre of the drum. For the purposes of the following description, it is assumed that the drum 10 comprises a number of side panels, preferably an even number, extending vertically, i.e. parallel with central axis A, the configuration of the drum being such that in cross-section perpendicular to the axis A, the side walls or panels define a figure which is a regular polygon, (with an even number of sides where there is an even number of side panels), except that, as indicated below, each side wall of the drum is actually made slightly concave on its interior side. The faces or sides of the drum are constructed as wire grid polarisers and thus each may comprise an array of parallel conductors or wires, for example supported mechanically by a supporting means (not shown) transparent to the radiation concerned. In each face or side of the drum, the parallel conductors or wires extend at 450° with respect to the direction of the axis A of the drum, the sides of the drum being identical with one another so that, as viewed in FIG. 1, the parallel wires or conductors of the drum side wall nearest the observer, and lying between the observer and the axis A, extend from top left to bottom right, whilst the parallel wires or conductors of the diametrically opposed side of the drum, and lying beyond the axis A from the point of view of the observer, extend from top right to bottom left. Accordingly radiation passing from the position of the observer in FIG. 1, through the side wall of the drum nearest the observer will be plane polarised in one direction at 45° with respect to the direction of the axis A, that direction being such that such polarised radiation will be reflected back towards the observer, (and thus towards the axis A), from the side wall of the drum which is furthest from the observer in FIG. 1.

Figure 2:
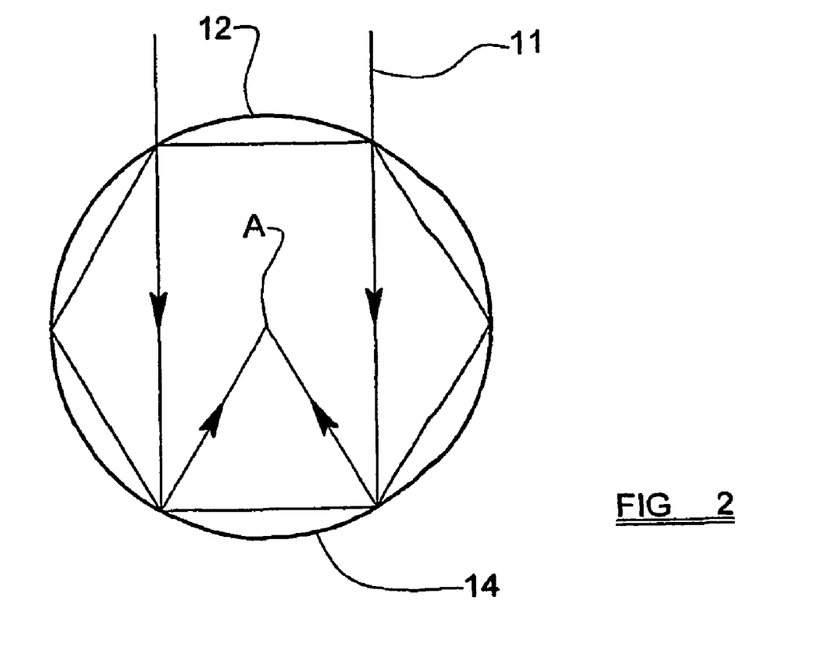
FIG. 2 is a schematic plan view of the part of the apparatus shown in FIG. 1.

As noted above, the sides of the drum, or at least the notional surfaces on which lie the wires of the wire grid polarisers, are not precisely planar, but are slightly concave on their sides facing towards the axis A, and are configured so as to form concave mirrors, so that, for example, as illustrated in FIG. 2, a parallel beam of radiation 11 passing through one side 12 of the drum from the outside, along a diameter of the drum, in a direction parallel with the principal optical axis of the drum side 14 from which it is to be reflected, will be focused by side 14 towards a focal point which may be substantially on the axis A, as illustrated in FIG. 2.

Thus, referring to FIGS. 1 and 2, the face 14 acts as a concave mirror and focuses the incident radiation, normal to face 12, onto the axis of rotation A of the drum 10. As the drum rotates, so rotation from different azimuthal angles is brought to a focus at the axis A of rotation.

Figure 3:
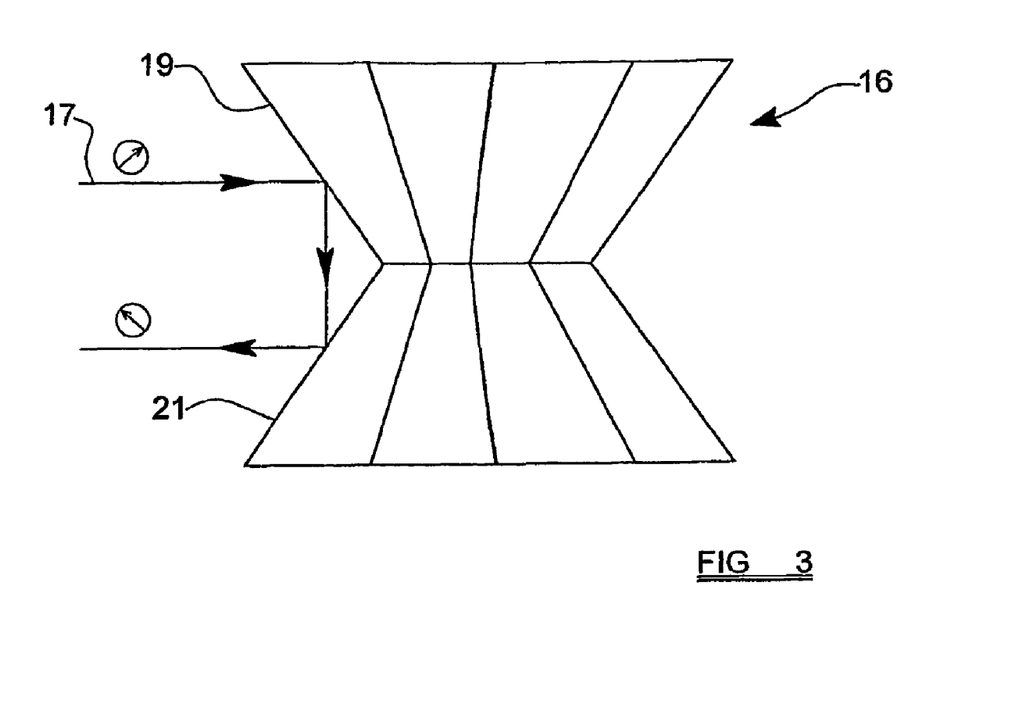
FIG. 3 is a schematic side view of a second part of the apparatus.

Referring to FIG. 3, a rotating reflective member 16 is mounted within the drum for rotation about the axis A, (or about a parallel axis). This second rotating reflector 16 is also mounted in a stationary supporting structure (not shown) for such rotation and means (not shown) is provided for rotating the member 16 about its axis, at one half the speed of the primary drum 10 and in the same rotational sense. The rotating reflective member 16 comprises a plurality of radiation reflective faces or facets and has, in cross-section perpendicular to its rotary axis, the form of a regular polygon centred on that axis, with the number of sides being twice the number of sides of the drum 10, said sides being defined by said faces or facets. The reflective member 16 may simply comprise a plurality of generally vertical substantially flat reflective sides parallel with the rotary axis of the member 16, and may be arranged to reflect radiation directly onto a receiver array (not shown) within the primary drum 10. However, for reasons explained below, it is preferred that the reflective member is of the "waisted" form shown in FIG. 3.

It will be appreciated that radiation passing from outside the primary drum 10 from the scene being scanned, substantially normal to the primary drum side wall which is for the time being the entry side for such radiation, can be regarded as a beam of radiation from the scene scanned and which sweeps around the axis A as the drum 10 rotates. This beam, after reflection at the rotating secondary reflector/reflective member 16, is substantially stationary, allowing it to be collected effectively by a stationary radiation detector (not shown), which may be mounted within the drum 10. Thus, as the drum 10 rotates, one of its faces at a time is used to scan the scene. At the limit of the scan the radiation being collected by the radiation detector from the scene scanned passes from one face of the secondary reflective member 16 to the next and the next face of the rotating drum 10 becomes that through which the radiation reaching the radiation detector from the scene-scanned passes and thus the next scan begins.

The location of the stationary radiation detector or detector array is in general a matter to be determined by considerations of mechanical convenience, requirements for compactness, etc. However it is possible to take advantage of the polarisation of the radiation after reflection by the reflective member 16 to minimise radiation losses between reflective member 16 and the radiation detector array. For example, it may be convenient to locate the radiation detector or detector array outside the drum 10 and to reflect the radiation from the reflective member 16 through the side walls of the drum 10 to the radiation detector or detector array. In this case, it is generally necessary to, ensure that direction of polarisation of the radiation after reflection from reflective member 16 towards the radiation detector or detector array is rotated through 90 degrees (with respect to its direction of polarisation before striking the secondary reflective member), before the radiation reaches the side walls of drum 10 in order to allow the radiation to pass through such side walls. This may be done by placing a Faraday rotator or a quarter wave plate within the drum in front of reflective member 16 and between reflective member 16 and the radiation detector or detector array. Alternatively, as illustrated in FIG. 3, the central reflective member 16 may be of the wasted form shown, comprising a plurality of pairs of reflective facets, the facets of each pair being perpendicular or nearly perpendicular to each other, equally and oppositely inclined with respect to the rotational axis of the central drum and so disposed that the line of intersection of the facets of each said pair forms a respective side of a regular polygon centred on the rotational axis of the member 16 said polygon, (as noted above) having twice the number of sides as the main drum 10. Again, of course, the central secondary reflector 16 rotates at half the speed of the main drum 10. As illustrated, incoming radiation 17 striking an upper facet 19 of the member 16 is reflected by upper facet 19 onto the lower facet 21 of the respective pair of facets and is reflected from that lower facet back away from the member 16. Conversely, incoming radiation striking a lower facet 21 of the member 16 is reflected by that lower facet 21 onto the upper facet 19 of the respective pair of facets and is reflected from that upper facet back away from the member 16. The radiation is thus reflected twice by the member 16 and is thus reflected from the secondary reflector 16 with the correct polarisation to pass through the outer drum 10.

Figure 4:
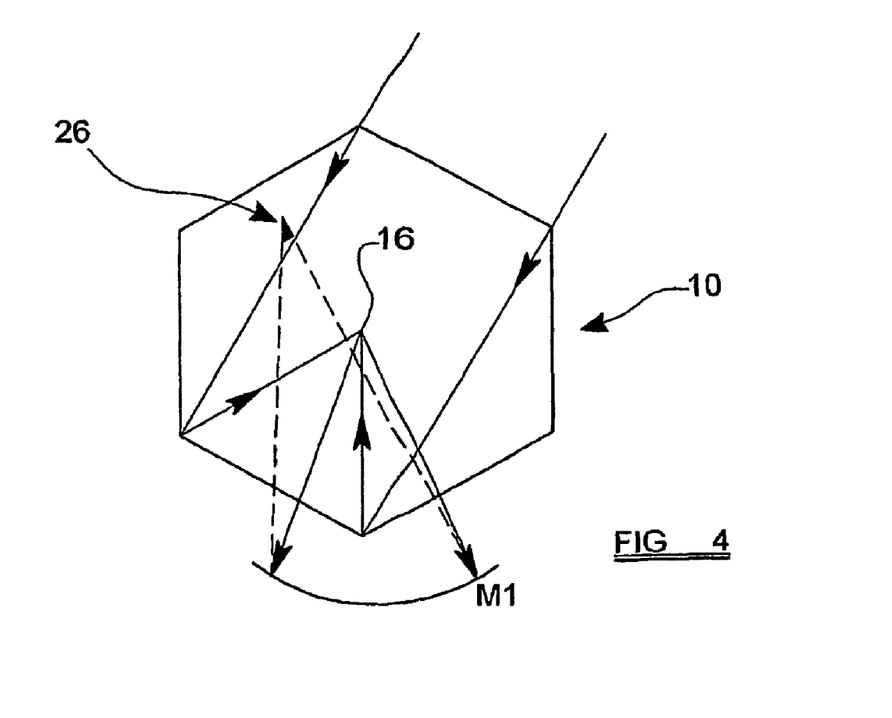
FIG. 4 is a plan view incorporating a ray diagram illustrating operation of the apparatus of FIGS. 1 to 3.

In the arrangement shown in FIG. 4, after reflection at the central reflective member 16, represented by centre point 16 in FIG. 4, the radiation, having had its direction of polarisation rotated through 90 degrees by any of the expedients discussed above, passes through the main drum and is focused onto a vertical array 26 of radiation detectors (assuming the rotary axis A of the drum 10 to be vertical). In the arrangement illustrated in FIG. 4, radiation directed from the drum 10 by the secondary reflector 16 is reflected by a concave mirror M1 onto the detector array 26, which in the arrangement shown is located within the drum 10. However, the mirror M1 may be arranged instead to direct the radiation onto a receiver array outside the drum 10.

Figure 5:
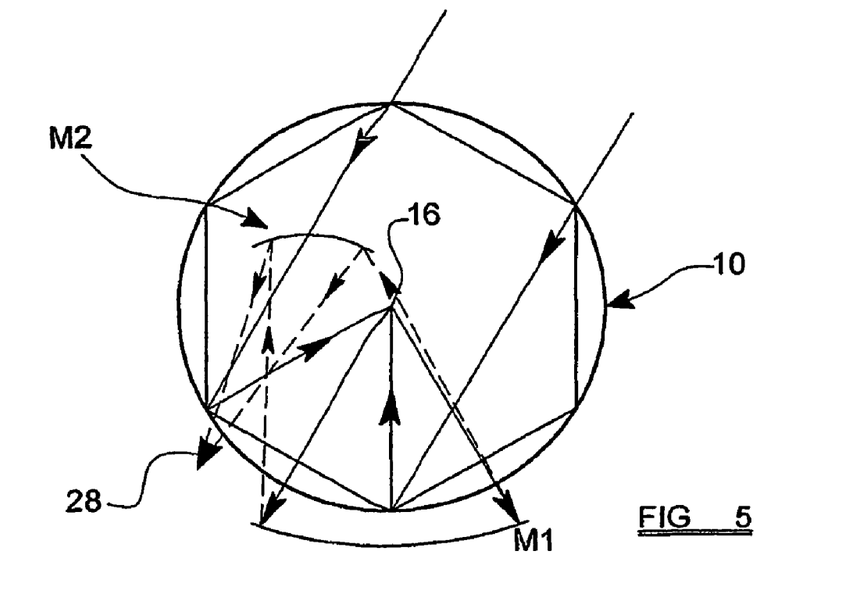
FIG. 5 is a plan view similar, to FIG. 4 but illustrating a variant arrangement.

In another variant, illustrated in FIG. 5, a concave mirror M1 outside the drum 10 again reflects radiation passing from the drum 10 back into the drum 10 but in this variant a further mirror M2, (which may also be a concave mirror), within the drum 10, is provided which in turn reflects the radiation onto a stationary vertical receiver array 28 outside the drum. In this variant, in order that the mirror M2 does not obstruct the field of view, the mirror M2, like the side walls of drum 10, is configured so that it reflects radiation with one direction of polarisation and transmits radiation with the orthogonal direction of polarisation. In a further variant, illustrated in FIG. 6, both the mirror M1 and the mirror M2 are located within the drum 10 and each is configured so that it reflects radiation with one direction of polarisation and transmits radiation with the orthogonal direction of polarisation, so that the mirrors M1 and M2 do not obstruct the field of view.

Assuming the central axis A to be vertical, the features of the arrangements thus far described only provide a horizontal scan of the field of view. If, as is generally required, a two-dimensional field of view is required, a raster type scan in which the horizontal scan provides a line scan may be provided by any of the expedients described for this purpose in WO03/012524. As an example, a line scan may be provided by providing a vertical array of radiation detectors, so that the number of raster lines would equal the number of detectors in the array. Alternatively, the side walls of drum 10, instead of being strictly vertical, i.e. parallel with the axis A, (or rather instead of having their principal axes extending strictly radially with respect to the axis A), may be variously inclined slightly to the axis A so that successive faces of the drum 10 would cause a different horizontal scan line in the field of view to be focused on a single receiving element. By combining these possibilities it is possible to obtain a scanning raster in which the number of scan lines is equal to the product of the number of receivers in a vertical receiver array by the number of faces of the drum 10. Thus, if the drum 10 has six faces, as illustrated, the number of horizontal scan lines in the scanning raster will be six times the number of receivers in the array.

Figure 6:
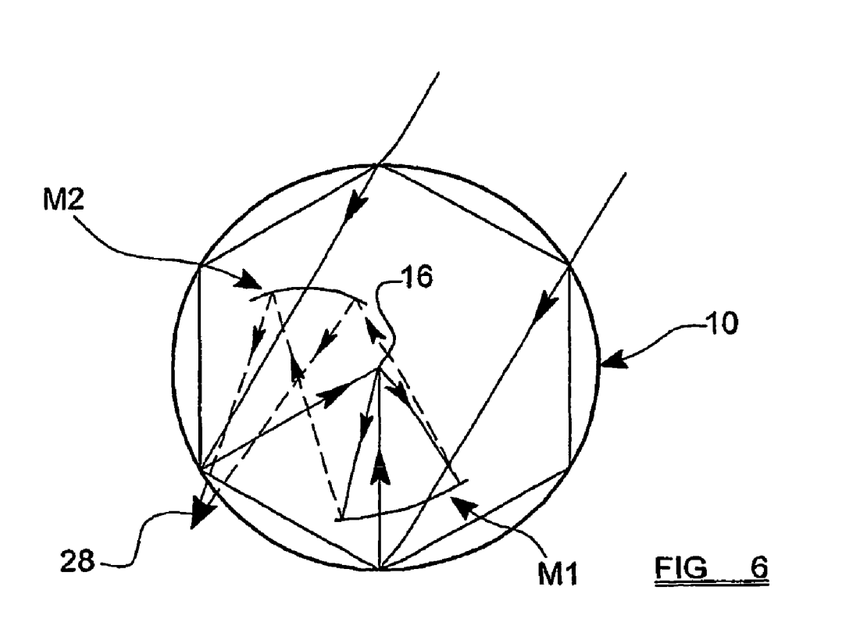
FIG. 6 is a plan view similar to FIG. 4 but illustrating a yet further variant.

As a further possibility, in arrangements corresponding to those illustrated in FIG. 4, 5 or 6, one or possibly both of the mirrors, M1 and M2 could be arranged to tilt about an axis perpendicular to the axis of rotation of the hollow drum 10, so as to effect a "field scan" as the rotating drum 10 produces a line scan.

In a further variant, the secondary reflective member 16 could be configured as a prism having roof reflectors and the orthogonal or field scan could be achieved by displacing this prism along its axis of rotation. Either the whole prism could be displaced as a function of time or else this prism could be fixed and individual reflectors displaced with respect to their neighbouring reflectors as a function of time.

FIGS. 7 to 12 illustrate alternative embodiments of scanning apparatus for producing a linear scan pattern, in accordance with the second aspect of the invention. In these embodiments, the scanning arrangement consists of two counter-rotating radiation reflective discs which are mounted for rotation in supporting structure (not shown) about respective axes. The planes of the discs are tilted slightly with respect to their axes of rotation, i.e. so that the normal to the plane of each disc is inclined slightly with respect to its rotational axis.

Figure 7:
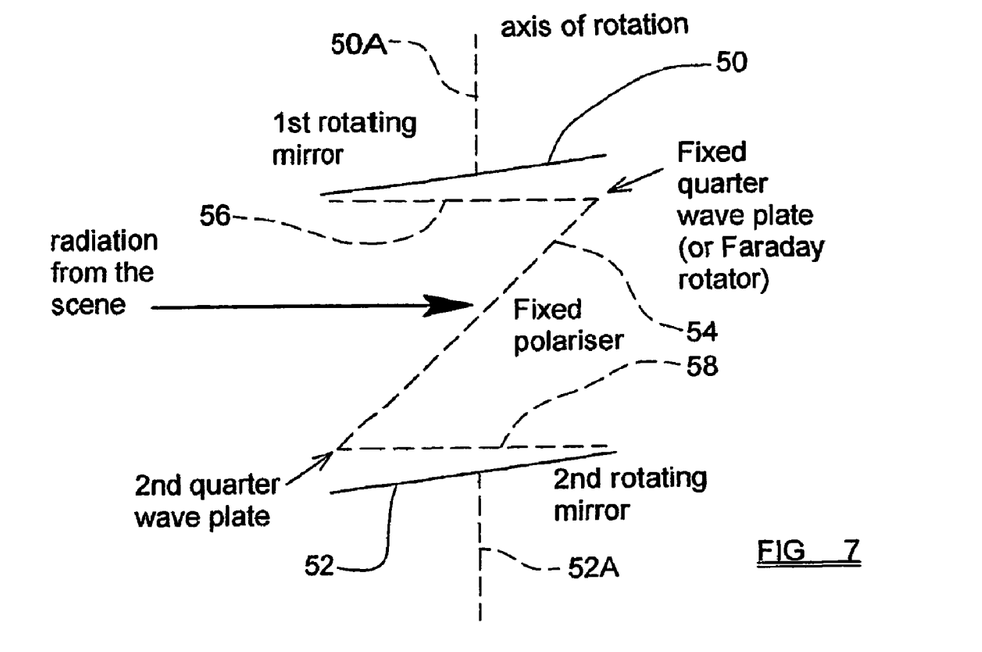
FIG. 7 is a schematic side view of part of another apparatus embodying the invention.

In the arrangement of FIG. 7, these discs are plane mirrors, 50, 52 and the normals to the planes of the mirrors are tilted by the same angle with respect to the respective axes of rotation 50A, 52A of the discs 50, 52. The mirrors 50,52 rotate at the same rate as each other but in opposite senses.

In the arrangement shown in FIG. 7, the axis 50A, 52A are coincident, i.e. they are one and the same, but this is not essential. A fixed wire grid polariser 54 is mounted between mirrors 50,52 at about 45° to the axis of rotation of the two mirrors, 50, 52. Ideally, the transmission axis of the polariser 54 should be parallel with or perpendicular to the plane of incidence of the radiation arising from the centre of the field of view of the scanner. Plane polarised radiation from the scene being scanned is reflected from the polariser 54 onto the first rotating mirror 50, after passing through a component 56 which may be a quarter wave plate or alternatively a Faraday rotator. The radiation reflected by the first rotating mirror 50 passes back through the quarter wave plate, (or Faraday rotator) 56, after which its direction of polarisation has been rotated by 90° with respect to the radiation reflected towards mirror 50 from the wire grid polariser 54. In this case, the radiation reflected at the first rotating mirror 50 passes through the inclined polariser 54 and falls on the second rotating mirror 52, after passing through a second component 58 which again is a quarter wave plate or Faraday rotator.

Figure 8:
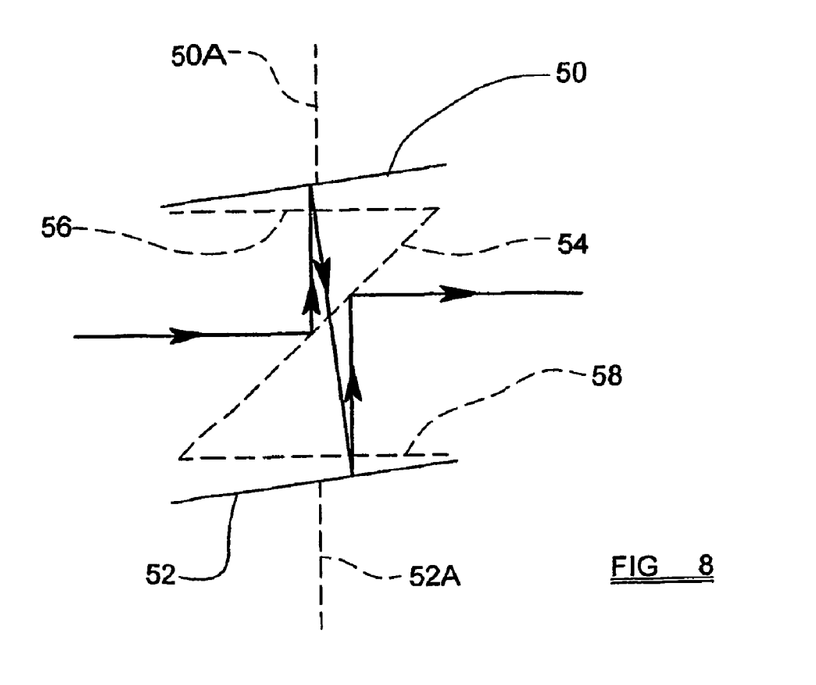
FIG. 8 is a view similar to FIG. 7, incorporating a ray diagram.

On reflection at the second rotating mirror 52, this radiation passes back through the second quarter wave plate or Faraday rotator 58 and is reflected at the inclined polariser 54 as illustrated by the ray diagram in FIG. 8.

When the radiation is thus reflected for the second time by the plane polariser 54, it leaves the linear scanner arrangement shown (leaving towards the right in FIG. 8 in substantially the same direction as the incoming radiation from the scene being scanned), and passes either to an orthogonal linear scanner, (to effect a frame scan of a scanning raster whilst the rotating discs provide the line scan of the raster), or to a linear array of radiation detectors as; discussed above and as disclosed in WO03/012524. The direction of line scan depends on the phase of the two counter-rotating inclined mirrors 50,52. For example, if the two mirrors are parallel when viewing the middle of the field of view, then the scan direction is substantially horizontal, assuming that their axes of rotation 50A, 52A are vertical.

In other embodiments, any one or both of the rotating mirrors may be curved. For example, the first rotating mirror 50 may be slightly curved to correct for spherical aberrations and may additionally be, concave to provide a converging effect on radiation reflected towards the second rotating mirror, whereby the size of the second rotating mirror may be reduced. It is not possible to reflect from a powered mirror at a significant off-axis angle without introducing serious aberrations. However, the use of the polarising beam splitter 54 inclined at 45° with respect to the rotary axis of discs 50, 52, between the two rotating discs, makes it possible to achieve a near-normal incidence and reflection of radiation at the first rotating mirror 50. The second mirror 53, in this arrangement, may, as shown in FIG. 9, be sufficiently spherically concave to produce a real image of the scene scanned close to the polarising fold mirror 54 as illustrated in FIG. 9.

Figure 9:
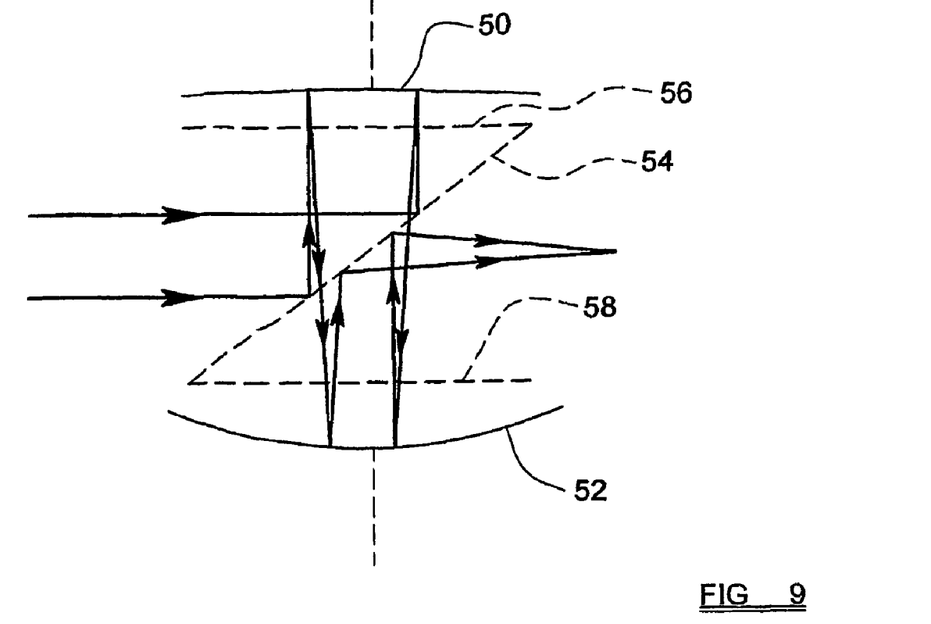
FIGS. 9, 10 and 11 are views similar to FIGS. 7 and 8 of respective variants.
Figure 10:
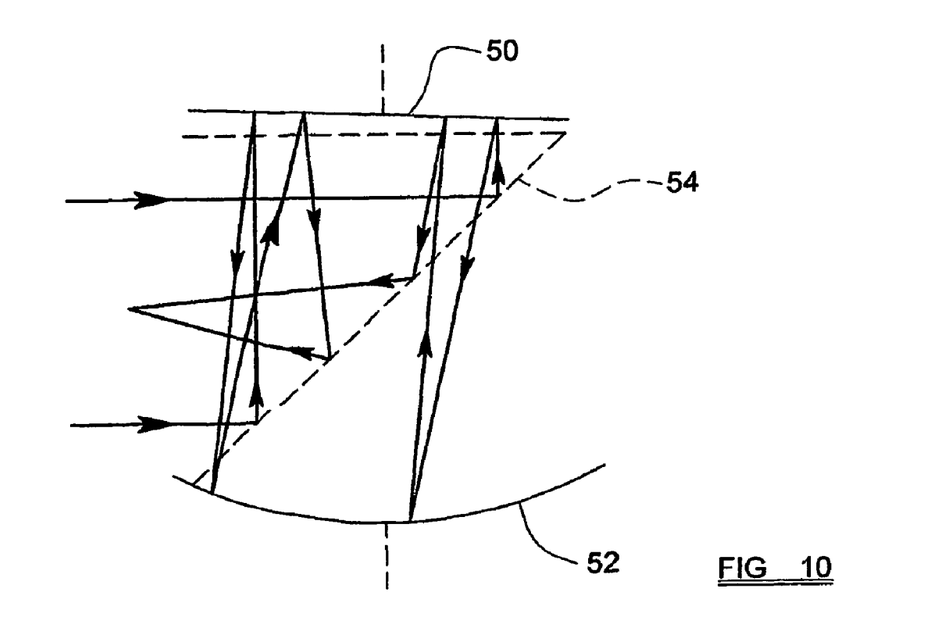

In the scanning arrangement illustrated in FIG. 9, if the second quarter wave plate, (or Faraday rotator) 585 is omitted, then, as illustrated in FIG. 10, the radiation reflected at the second rotating mirror 52 passes back through the inclined polariser 54, to be reflected again from mirror 50, to strike polariser 54 again and be reflected by the polariser to form an image on the input side of the scanner. A detector, or an array of detectors, may be placed, at this image surface.

In this optical arrangement, the first rotating mirror is reflected from twice and its inclination must be half the effective inclination of the second rotating mirror. An advantage of this latter configuration is that pupil wander in a direction parallel to the direction of scan is effectively removed. The scanning mechanisms illustrated in FIGS. 9 and 10 may be used to produce a two dimensional image of the scene by placing a linear array of detectors at the focal plane. The direction in which the line of detectors in this detector array extends is perpendicular to the direction of line scan. Alternatively, the radiation leaving this scanning mechanism may pass to a separate orthogonal scanner. The orthogonal scan (which completes the frame scan) may also be achieved by tilting the plane polariser 54 in FIGS. 9 and 10 respectively back and forth about an axis of rotation through its centre. Thus, the rotating discs 50, 52 could be used to produce a (line) scan of the scene in a direction perpendicular to their axis of rotation, while the plane polariser 54 could be tilted about an axis in the same direction as the scan. In this way, a two dimensional scanning raster may be generated. Radiation from the scene scanned is reflected from the polariser 54 which may be tilted about a horizontal axis. This reflected radiation falls on to the first rotating mirror 50 after passing through the Faraday rotator (or quarter wave plate) 56. On reflection at the first rotating mirror 50, the radiation passes again through the Faraday rotator (or quarter wave plate) 56 with its direction of polarisation now at 90° to that of the radiation originally reflected from the polariser 54. This radiation is therefore-able to pass through the polariser 54 and be incident at the second rotating mirror 52. On reflection at the second rotating mirror, the radiation again passes through the polariser 54 and falls on the first rotating mirror 50 for a second time. When it is reflected now by mirror 50, the radiation passes to a single element receiver or multi-element array located at the point F in FIG. 11. It may be necessary to cut a hole in the polarising plane mirror 54 and to use a plane fold mirror located near the centre, of mirror 54 to reduce obscuration (this would place the focal point and the position of the receiver to the right of the structure in FIG. 11). Motion of the polarising mirror 54 about its horizontal axis causes a vertical scan of the scene. The two rotating mirrors 50, 52 are, as in the embodiments of FIG. 7 to 10, tilted about their axis or axes of rotation and rotate at the same speed as one another but in opposite directions.

Referring again to FIGS. 10 and 11, with an appropriate initial relative phase in their rotational positions, the rotating discs 50, 52, may perform a horizontal (line) scan of the scene scanned. The effective tilt on the second rotating mirror 52 on its axis is ideally twice that of the first 50 on its axis. For a plane mirror 52, this effective tilt is equal to its actual tilt but for a powered second rotating mirror, the actual tilt is equal to the effective tilt multiplied by a factor of (1−x/R) where x is the spacing between the two rotating mirrors and R is the radius of curvature of the powered mirror. In this context, a concave mirror has a positive value of R. For a powered, e.g. convex, mirror, the actual tilt is, of course, the angle between the principal axis, (axis of symmetry) and the rotational axis.

In yet another embodiment, the first and second rotating tilted mirrors perform both the high speed line scan pattern and the orthogonal scan (which completes the frame scan). In this case, each mirror rotates about two axes. Thus, referring to FIG. 12, in this arrangement, for each mirror, its rotational axis B is arranged to precess about another axis A. In this example, the normal through the centre of each mirror is tilted at an angle β to the local axis of rotation B of the mirror and this axis B itself rotates, at a slower speed, about a fixed axis A and makes an angle α to the axis A. Each mirror rotates at the same high speed about its respective local axis B and the mirrors in combination perform a substantially linear (line) scan pattern of the scene. The two axes B also rotate at the same slower speed as one another about their respective axes A, to produce an orthogonal (field) scan. The relative angles of inclination α and β on each rotating mirror and the direction and phase relationships between the rotating mirrors 50 and 52 are such that the two mirrors-perform a raster scan of the scene. In the last noted system, the optical arrangement (ignoring the precession of the rotational axes of the mirrors 50, 52), is as illustrated in FIG. 10, the wire grid polariser 54 in this case being fixed whilst the two mirrors 50-52 rotate and precess in opposite directions when viewed along the axis A of precession of one of the mirrors. When the axes of precession are vertical, then a substantially horizontal line scan may be achieved of the scene with the high speed rotation and a vertical frame scan may be achieved with the lower speed angular precession. Since, as in FIG. 11, two reflections occur at the first rotating mirror, (corresponding to mirror 50) and only one reflection at the second mirror (corresponding to mirror 52), the effective angle β of inclination and α of inclination of the rotational axis with respect to the precession axis, for the first mirror, are half of those for the second mirror.

The actual angles of inclination β and precession α depend on the desired fields of view and curvatures of each rotating mirror. For example, if the first mirror were substantially plane, then a tilt of 2.5° of this mirror and an effective tilt of 5° of the second mirror would achieve a horizontal line scan of plus or minus 20°. Similarly an angle of precession of 2.5° on the first mirror and an effective angle of precession of 5° on the second mirror could achieve a vertical frame scan also of plus or minus 20°.

Figure 11:
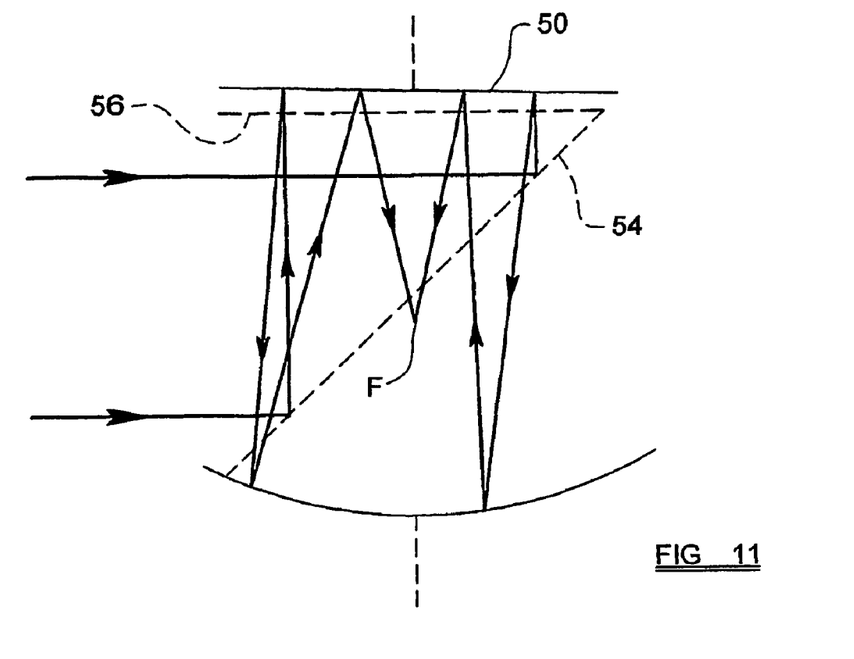

The actual angles of tilt and precession on the second mirror are the effective values multiplied by (1−x/R) where x is the spacing between the upper and lower mirrors and where R is the radius of curvature of the second (lower) mirror 52 in FIG. 11.

The frame rate and number of scan lines in the scan pattern depends on the actual speeds of the high-speed rotation and the lower speed precession. There are two scan lines per rotation and two frames per precession. So to achieve a frame rate of 10 Hz the precession speed is 300 rpm. Also with 100 scan lines per frame and 10 parallel receiver channels the speed of rotation is 3000 rpm. In this situation the actual number of useable scan lines is less than 100 since the scan lines overlap towards the top and bottom of the frame.

Figure 12:
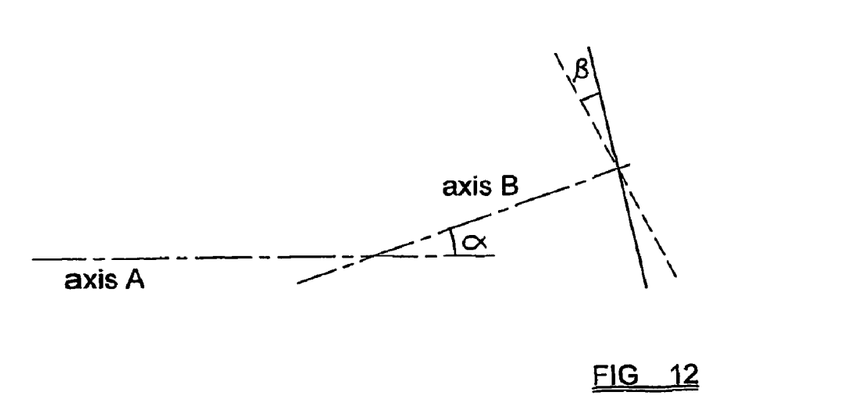
FIG. 12 is a schematic diagram illustrating part of a yet further variant.
Figure 13:
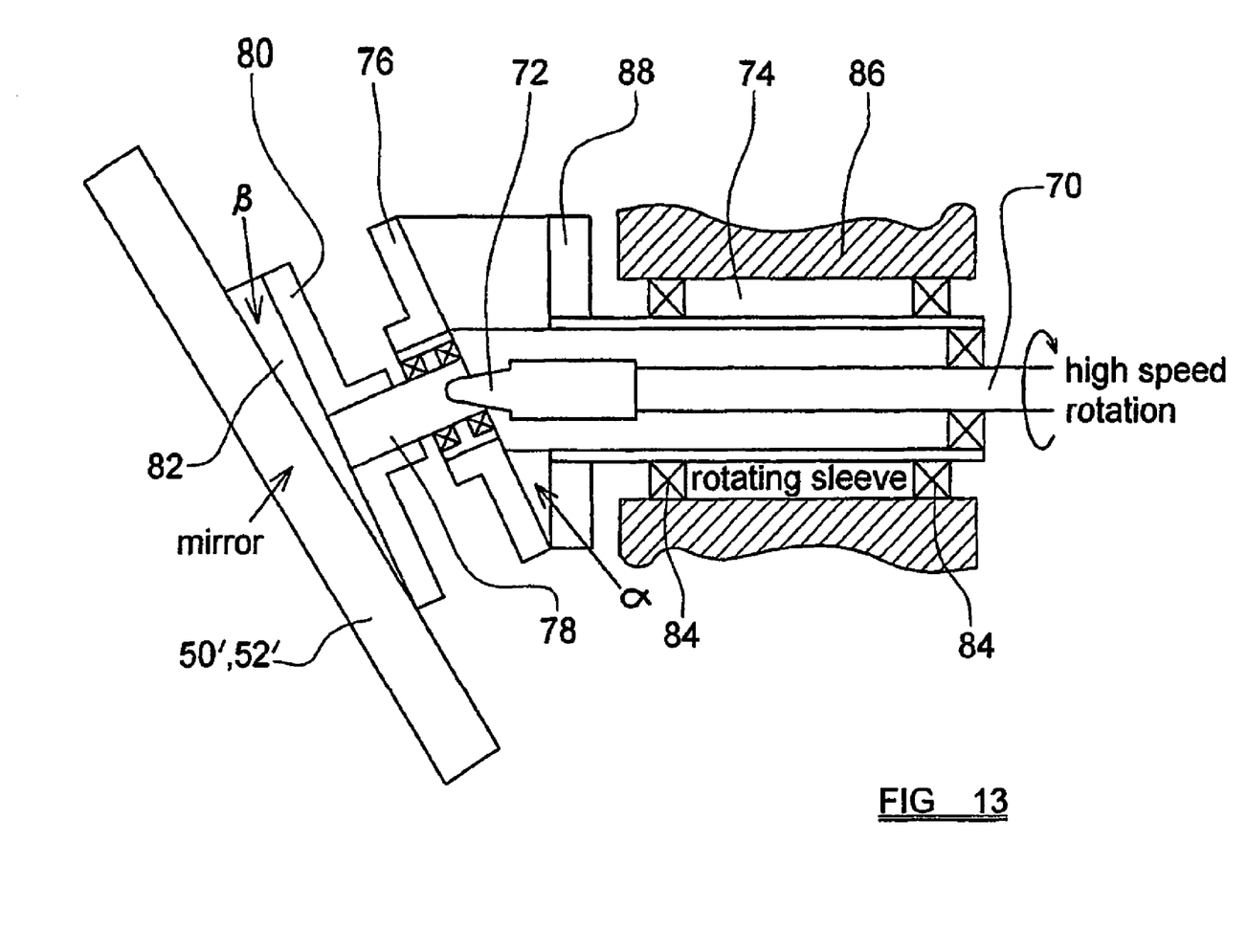
FIG. 13 is a sectional view illustrating a practical arrangement embodying the operational principle to which FIG. 12 relates.

The high speed rotation and lower speed precession of the arrangement described above may be achieved, for each mirror using the mechanical arrangement shown in FIG. 13 in which a high speed rotating shaft 70 rotates the mirror 50', 52'—via a universal joint 72, (preferably a constant velocity universal joint). The shaft 70 is journalled in a sleeve 74 and a bearing portion 76 fixed to or integral with the sleeve 74 carries bearings in which a shaft 78 carrying a mirror mount 80 is supported for rotation, the universal joint referred to connecting the shaft 78 with the shaft 70. The rotational axis of shaft 78 corresponds with the axis B in FIG. 12 whilst the rotational axis of the shaft 70 corresponds with the axis A in FIG. 12. In the arrangement shown in FIG. 13, the mirror mount 80 is shown as comprising a plate arranged perpendicular to the axis of shaft 70 and a wedge 82, having a wedge angle β, is interposed between the mirror 50', 52' and the aforesaid perpendicular plate. It will be appreciated, of course, that in a production version, the wedge 82 and plate 80 may be formed as an integral component. The sleeve 74 is in turn supported by bearings 84 for rotation in a stationary supporting structure, indicated only fragmentarily at 86 in FIG. 13.

In FIG. 13, reference 88 represents a plate fixed to one end of the sleeve. 74 perpendicular to the axis of the latter and the frame part 76 is shown as having the general form of a plate generally perpendicular to the axis of the shaft 78. Thus the angle α between the faces of the last-noted plate and the plate 88 is the angle α of the arrangement of FIG. 12. It will be appreciated, of course, that the components 76, 88, 74 may, as indicated above, be formed as an integral structure and need not have the specific form shown provided that the angle α between the axis of shaft 78 and the axis of shaft 70 is maintained. Means, not shown, is provided for rotating the shaft 70 at an appropriate relatively high speed and for rotating the sleeve 74 at the appropriate lower speed of precession.

There has been described above the addition of a precession to the rotational axis of the mirror discs of the rotating disc scanner illustrated in FIG. 10. This principle may also be applied to other forms of two-rotating-tilted-mirror scanners to achieve a two dimensional (raster) scan pattern. The same principle may also be applied to scanners of the type using a single tilted-rotating-mirror to achieve an improved utilisation of receiver channels.

In addition, the provision for precession of the rotational axis may also be applied to rotating polygon scanners such as that described with reference to FIGS. 1 to 4, to achieve a two dimensional scan pattern from an otherwise one dimensional scanner, for example by arranging the rotational axis (corresponding to axis B FIG. 12) of the rotating polygon or drum at a tilt angle, (corresponding to angle α in FIG. 12) with respect to an axis (corresponding to axis A in FIG. 12) of precession, about which the spin axis (corresponding to axis B) is arranged to precess at a slower rate than the rate of spin about the spin axis.

A further apparatus embodying the invention may have the same form as indicated schematically in FIG. 12 and may have the same physical form as illustrated in FIG. 13. The apparatus may thus, as in FIG. 12, likewise comprise a mirror, such as a plane mirror or a concave mirror, mounted for rotation about a rotational axis B which in turn is arranged to precess about another axis A inclined with respect to axis B. Thus, again, the normal through the centre of the mirror is tilted at an angle β to the local axis of rotation B of the mirror and this axis B itself rotates about fixed axis A and makes an angle α, which in this case is equal to the angle β, with respect to the axis A. In accordance with this further embodiment, however, the rate at which axis B rotates about axis A is the same as, but in the opposite rotational sense from, the rate at which the mirror rotates about axis B and as a result, the mirror behaves optically as if it were simply caused to oscillate about a fixed axis, i.e. it simulates the optical effect of a flapping mirror, but without the changes of angular momentum which place practical limitations on the size of flapping mirrors and/or on the rates at which such mirrors can be flapped. This arrangement thus effects a linear scan, with the directions of the inclinations of the mirror with respect to axis B and of the axis B relative to axis A determining the direction of the scan. A practical form of this further embodiment may be identical with that described above with reference to FIG. 13, except that the structure 74 is rotated in the opposite rotational sense from the shaft 70 but at the same rotational, rate with respect to the stationary structure 86 as the shaft 70.

In use of the scanning mechanism described in the preceding paragraph to produce a two-dimensional image of scene, provision is made for bringing radiation reflected from the mirror to a focus in a focal plane or surface, e.g. by making the rotating mirror a concave mirror, or by providing some other focusing means, whereby the radiation reflected from the mirror is focused in the focal plane. In one embodiment, a linear array of detectors is placed at the focal plane, the direction in which the line of detectors in this detector array extends being again perpendicular to the direction of line scan. Alternatively, the radiation leaving this scanning mechanism may pass to a separate orthogonal scanner. The orthogonal (frame) scan may, for example, be achieved by a flapping mirror flapping at a rate significantly lower than the line scan rate. Alternatively, of course, a further rotating mirror with its rotary axis precessing at the same rate as, but in the opposite sense from, that further rotating mirror may be used to simulate the effect of the flapping mirror flapping at an appropriate frame scan rate. Likewise, a scanning mechanism as described with reference to any of FIGS. 1 to 6 might be used to effect a frame scan of the field of view, with a rotating mirror precessing at the same rate as, but in the opposite sense from, its direction of rotation receiving the radiation from such scanning mechanism to effect an orthogonal line scan, or such rotating precessing mirror, might, for the same purpose, direct radiation from the field of view onto such rotating drum scanning apparatus or, of course, in such arrangements, the line scan might be effected by the rotating drum scanner with the field scan being effected by the rotating precessing mirror.

The invention claimed is:

1. Scanning apparatus operable in the microwave, mm-wave sub mm wave (TeraHerz) and infrared ranges and comprising a support structure, a radiation detector or receiver, a first disc or mirror having a first reflective surface, the first disc or mirror mounted in the support structure for rotation relative to the support structure about a first axis, wherein the first reflective surface has an axis of rotational symmetry tilted at an angle relative to the first axis, a second disc or mirror having a second reflective surface, the second disc or mirror mounted in the support structure for rotation relative to the support structure about a second axis, wherein the second reflective surface has an axis of rotational symmetry tilted at an angle relative to the second axis, a driving means to drive the first and second discs or mirrors in respective opposite senses, wherein the first and second discs or mirrors are adapted such that radiation from a scene being scanned can reach the first reflective surface of the first disc or mirror to be reflected thereby as a first reflected radiation onto the second reflective surface of the second disc or mirror; the second reflective surface, in turn, reflecting the first reflected radiation as a second reflected radiation onto the radiation detector or receiver for processing the second reflected radiation.

2. Scanning apparatus as claimed in claim 1, wherein the first and second discs or mirrors are concave mirrors, arranged with their concave sides facing one another and wherein a wire grid polariser is located between the concave mirrors inclined at an angle with respect to the two concave mirrors, the wire grid polariser being adapted to receive radiation, from a scene being scanned, and to reflect a plane polarised component of such radiation towards the first concave mirror, and wherein a first quarter wave plate, Faraday rotator or equivalent device is located between the first concave mirror and the wire grid polariser, whereby the plane polarised component of the radiation passing to the first concave mirror and reflected thereby towards the second concave mirror has its polarisation direction shifted through 90° in passing through the first quarter wave plate, Faraday rotator or equivalent device, such that it can pass through the wire grid polariser to the second concave mirror to be focused in turn by the second concave mirror onto the radiation detector or receiver.

3. Apparatus according to claim 2, wherein a second quarter wave plate or Faraday rotator or equivalent device is located between the wire grid polariser and the second concave mirror, whereby radiation passing through the second concave mirror and reflected thereby towards the first concave mirror has its polarisation shifted through 90° in passing through the second quarter wave plate, Faraday rotator or equivalent device and is reflected by the wire grid polariser, in a direction away from the scene being scanned, towards the radiation detector or receiver.

4. Apparatus according to claim 2 wherein the second concave mirror is adapted to direct radiation towards the radiation detector or receiver indirectly, by directing the radiation through the first quarter wave plate, Faraday rotator or equivalent device to the first concave mirror, to be reflected again, in turn, by the first concave mirror.

5. Apparatus according to claim 4, wherein radiation that is reflected by the first concave mirror and subsequently passes through the first quarter wave plate, Faraday rotator or equivalent device, is reflected again by the wire grid polariser, towards the radiation detector or receiver.

6. Scanning apparatus operable in the microwave, mm-wave, sub mm-wave (TeraHerz) and infrared ranges and comprising a first support structure arranged to position the scanning apparatus with respect to a field of view, a reflective disc or mirror which is mounted in the first support structure for rotation relative to the first support structure about a first axis and wherein the reflective surface of the first disc or mirror has an axis of rotational symmetry tilted at an angle relative to the first axis, a second support structure, wherein the first support structure is mounted for rotation with respect to the second support structure about a second axis that is inclined with respect to the first axis at the same angle as that at which the axis of rotational symmetry is tilted relative to the first axis, the scanning apparatus further including a disc rotating means for rotating the reflective disc or mirror on or in the first support structure about the first axis at a first rate relative to the second support structure and a support rotating means for rotating the first support structure, relative to the second support structure about the second axis at the same rotation rate as the first rate but in the opposite rotational sense from that in which the reflective disc or mirror is rotated, whereby the reflective disc or mirror can effect a back and forth linear scan in the field of view.

7. Apparatus according to claim 6 further having a field scan means for effecting an orthogonal scan at a different rate in a field of view to produce a two-dimensional raster scan of the field of view.

8. A scanning apparatus operable in the microwave, mm-wave, sub mm wave (TeraHerz) and infrared ranges and comprising a support structure arranged to position the scanning apparatus with respect to a field of view, a receiver assembly which includes a radiation detector, a primary drum which is mounted in the support structure for rotation relative to the support structure about a rotary axis of the primary drum, and adapted to emanate radiation from the field of view, the primary drum further being hollow and of rectangular polygonal form to provide a number of polygon sides or facets wherein each polygon side or facet is adapted to transmit radiation that is plane polarised in a first direction at 45° with respect to the rotary axis of the primary drum, and wherein each polygon side or facet is adapted to reflect radiation that is plane polarised in a second direction at 45°, to the rotary axis of the primary drum and perpendicular to the first direction, and wherein each polygon side or facet is further configured to act as a concave mirror, to focus the radiation towards the receiver assembly, when reflecting radiation striking that polygon side or facet from within the primary drum; and wherein, the scanning apparatus is adapted such that radiation from a scene being scanned passing into the primary drum through any polygon side or facet of the primary drum currently facing the field of view and passing towards a corresponding diametrically opposite polygon side or facet will be plane polarised with a polarization direction such as to be reflected back by the corresponding diametrically opposite polygon side or facet towards the rotary axis of the primary drum, to be detected by the radiation detector.

9. Apparatus according to claim 8, wherein the radiation detector is stationary with respect to the support structure, and wherein the receiver assembly includes a diametric reflection means whereby the radiation reflected back from the corresponding diametrically opposite polygon side or facet of the primary drum reaches the radiation detector as a substantially stationary cone.

10. Apparatus according to claim 8, wherein the receiver assembly includes a radiation reflective member mounted within the primary drum for rotation, in the support structure, about a member axis that is coincidental with or parallel with the rotary axis of the primary drum, the radiation reflective member having a plurality of radiation reflective facets and being such that, in section in a plane perpendicular to the rotary axis, the reflective facets define a regular polygon with twice as many sides as the primary drum, a speed rotation means for rotating the radiation reflective member at one half the speed of the primary drum, and in the same rotational sense, and wherein the receiver assembly further includes a directive means for receiving radiation reflected from the radiation reflective member, and for directing radiation so-received to the radiation detector.

11. Apparatus according to claim 10, wherein the directive means is located outside the primary drum and wherein the radiation reflective member is arranged to reflect radiation, to the directive means, through the sides of the primary drum.

12. Apparatus according to claim 10, wherein the radiation reflective member comprises a plurality of pairs of reflective facets, one facet of each pair being disposed further along the member axis of the reflective member than the other, the number of such pairs being twice the number of facets of the primary drum, and wherein the facets of each pair are so arranged that radiation directed onto one of the reflective facets after reflection from a side of the primary drum will be reflected onto the other reflective facet of the pair to be reflected thereby through the sides of the primary drum, to the directive means.

13. Apparatus according to claim 12, wherein the two facets of each pair of reflective facets are perpendicular to one another.

14. Apparatus according to claim 13, wherein the two facets of each pair of reflective facets are inclined at opposite 45° angles to the rotary axis of the radiation reflective member.

15. Apparatus according to claim 10, wherein the directive means comprises a transreflector, mounted within the primary drum and arranged not to obstruct plane polarised radiation reflected from a facet of the primary drum towards the radiation reflective member but to reflect radiation that is reflected towards the transreflector by the radiation reflective member, to the radiation detector.

16. Apparatus according to claim 11, wherein the receiver assembly further includes a polarizer rotating means provided within the primary drum and disposed between the radiation reflective member and the directive means for rotating the polarisation direction of radiation through 90° to pass through the sides of the primary drum.

* * * * *